United States Patent [19]
Ponizovsky et al.

[11] Patent Number: 5,542,967
[45] Date of Patent: Aug. 6, 1996

[54] HIGH VOLTAGE ELECTRICAL APPARATUS FOR REMOVING ECOLOGICALLY NOXIOUS SUBSTANCES FROM GASES

[76] Inventors: Lazar Z. Ponizovsky, App. 21, 9/11 Tovarishtchesky Per.; Aleksander Z. Ponizovsky, App. 319, 39, Ostrovityanov Str.; Viktor A. Potapov, App. 48, 50, Leningradsky Prosp.; Adolf P. Shvedchikov, App. 52, 180, Prospekt Mira, all of Moscow, Russian Federation

[21] Appl. No.: 319,379

[22] Filed: Oct. 6, 1994

[51] Int. Cl.⁶ .................................................. B03C 3/66
[52] U.S. Cl. ................... 96/82; 95/81; 204/157.3; 323/903; 361/235; 422/186.04; 422/186.15
[58] Field of Search ................... 96/80, 82, 77; 95/81, 80; 323/903; 422/22, 121, 186.15, 186.04; 204/302, 305, 157.3; 361/230–235

[56] References Cited

U.S. PATENT DOCUMENTS

| | | | |
|---|---|---|---|
| 2,085,758 | 7/1937 | Krutzsch | 96/80 X |
| 3,443,358 | 5/1969 | Drenning et al. | 96/80 X |
| 3,641,740 | 2/1972 | Schumann et al. | 96/82 X |
| 4,016,060 | 4/1977 | Lowther | 204/176 |
| 4,183,736 | 1/1980 | Milde | 361/235 X |
| 4,364,752 | 12/1982 | Fitch et al. | 361/230 X |
| 4,592,763 | 6/1986 | Dietz et al. | 96/80 X |
| 4,670,829 | 6/1987 | Dallhammer et al. | 96/80 X |
| 4,713,093 | 12/1987 | Hansson | 96/82 |
| 4,778,493 | 10/1988 | Fitch et al. | 96/77 |
| 4,779,182 | 10/1988 | Mickal et al. | 323/903 X |
| 4,808,200 | 2/1989 | Dallhammer et al. | 323/903 X |
| 4,873,620 | 10/1989 | Neulinger et al. | 96/82 X |
| 4,885,139 | 12/1989 | Sparks et al. | 422/169 |
| 5,255,178 | 10/1993 | Liberati | 96/80 |

*Primary Examiner*—Richard L. Chiesa
*Attorney, Agent, or Firm*—Robert Louis Finkel

[57] ABSTRACT

Electrical apparatus for removing ecologically noxious substances from gases which includes an electrical precipitator having a reaction chamber through which a stream of the gases to be cleaned passes, and which includes an elongated electrode extending into said reaction chamber for producing a corona discharge within the chamber. The apparatus of the invention includes a multi-stage Fitch generator connected to the electrode which produces a high level pulsating voltage superimposed on a constant direct current voltage. The pulsating voltage causes the electrode to produce the corona effect in the chamber, and the constant direct current voltage sets up an electrostatic field which removes unwanted products of the corona discharge from the gas stream passing through the chamber. The Fitch generator is adapted to provide pulsating voltages of sufficient amplitude and steepness to produce a high density, high energy corona discharge within the chamber. In this application, the Fitch generator allows the apparatus to operate for long periods of time without consuming excessive amounts of electricity.

7 Claims, 5 Drawing Sheets

HIGH VOLTAGE ELECTRICAL APPARATUS FOR REMOVING ECOLOGICALLY NOXIOUS SUBSTANCES FROM GASES

BACKGROUND

1. Field of the Invention

The present invention relates to methods and means incorporating electrostatic precipitators for cleaning air and industrial and domestic gases contaminated with ecologically noxious substances. More particularly, it provides an improved method and highly efficient electrical apparatus for that purpose.

2. Prior Art

In the prior art, gas cleaning is usually carried out in electrical precipitation reaction chambers in which contaminated gases flow through an electrode system.. The electrode system of such electrical precipitators is activated by short, high voltage electrical pulses superimposed on a constant, high, direct-current voltage. The pulses give rise to so-called streamer corona discharge within the reaction chamber causing a flow of high-speed electrons which activate or ionize gas molecules to produce non-noxious aerosols and solid particles within the chamber. The aerosols and solid particles are removed from the gases in the reaction chamber by the electrostatic conductive field created by the constant direct-current voltage existing between the electrodes of the electrode system.

The efficiency of the cleaning process depends on the density and the energy of the electron flow generated by the streamer corona discharge. Both of these parameters rise with an increase in pulse amplitude and with an increase in the steepness of the pulses. The pulse steepness is an important factor because the pulse amplitude that can be achieved without electrical breakdown of the inter-electrode space in the reaction chamber is a function of pulse steepness.

Based on these considerations, it is an objective of the present invention to provide an improved waste stream cleaning method and apparatus which embody a high voltage power supply capable of generating voltage pulses of the high amplitude and steepness required for producing a high density energy flow within a precipitation reaction chamber, and also of producing a constant, high, direct-current voltage on which the pulses are superimposed.

Another object is to provide a power supply for use with such a method and apparatus which is extremely efficient from an energy consumption point of view so that the apparatus may operate normally for long periods of time.

A further object of the invention is to provide a precipitation reaction chamber for such use which includes a high voltage corona-producing electrode that responds to the high voltage pulses from the power supply to generate a pulse streamer corona of sufficiently high current to enable the transfer of the required amount of electrical power into the gases in the precipitation chamber so as to activate or ionize the gas molecules to produce non-noxious aerosols and solid particles.

A still further object is to provide a reaction chamber constructed to permit the application without electrical breakdown of a constant direct-current voltage from the power supply which is sufficiently high for the removal of the resulting non-noxious aerosols and solid particles from the gases flowing through the reaction chamber.

There are two main groups of prior art apparatus for cleaning waste stream pollutants by means of electric discharge in a precipitation reaction chamber. A first group involves the use of a pulse transformer for the generation of high voltage pulses. Typical examples of the prior art apparatus of the first group are described in U.S. Pat. Nos. 4,016,060 and 4,808,200. A second group of prior art apparatus involves the use of a direct discharge by appropriate switching means of a power storage unit, such as a capacitor or a pulse-forming L-C line, to produce the high voltage pulses. Typical examples of the prior art apparatus of the second group are described in U.S. Pat. Nos. 4,183,736 and 4,713,093.

A disadvantage of apparatus using a pulse transformer, such as the apparatus of the first group, is the necessity of providing two separate power supplies, one for producing the constant direct-current high voltage for the reaction chamber, and a second for energizing the pulse-generating system, the second power supply being connected to the primary coil of the pulse transformer. Another disadvantage of the prior art apparatus of the first group resides in the fact that a pulse transformer capable of generating voltage pulses of the amplitude, power, duration and frequency required for producing a streamer corona is a very complicated and expensive device.

A disadvantage of the prior art apparatus of the second group is the impossibility of obtaining a pulse voltage with an amplitude greater than double the charge voltage. These devices are incapable of producing electrons with sufficiently high energy to perform an efficient gas cleaning operation in the reaction chamber.

Another disadvantage of the second group of prior art devices stems from the requirement that in order to avoid short circuits of the power supply, the power storage unit must be isolated from the power supply by a resistor or an inductance coil having high resistivity. However, in the periods when the capacitor in the power storage unit is being charged, the resistor or inductance coil dissipates as much power as is stored in the power storage unit, resulting in low efficiency.

Still another disadvantage inherent in the prior art apparatus of the second type lies in the fact that due to high resistivity of the inter-electrode space in the reaction chamber, only a part of the power stored in the power storage unit is inserted into the gas flowing through the reaction chamber. The remaining part of the power is dissipated in the resistivity of the overall circuit. This results in a further reduction in efficiency.

From the foregoing, it will be appreciated that another object of the subject invention is to provide a method and means for removing pollutants from a gas or liquid waste stream which avoid or overcome the various previously mentioned disadvantages of the prior art electrostatic cleaning methods and precipitators.

It is well known in the prior art that various processes for the removal of ecologically harmful substances from waste gas and liquid streams can be carried out or enhanced by treating the streams with conventional oxidizing agents, such as ozone. Certain prior art electrostatic precipitators are designed to produce ozone to enhance the oxidation process.

The efficiency of the oxidation of the pollutant molecules depends on their chemical structure and concentration and on the reactance of the particular oxidant or oxidants. By way of comparison, the reaction rate constants $K_{298}$ for several standard reactions involving typical inorganic and organic industrial pollutants in the presence of the most common oxidant-reagents at room temperature are set forth in the following Table 1.

TABLE 1

| Reaction | | | | | | $K_{298}$, cm³/molecule · sec |
|---|---|---|---|---|---|---|
| $O_3$ | + | $SO_2$ | → | $SO_3$ | + $O_2$ | $<8 \cdot 10^{-24}$ |
| OH | + | $SO_2$ | → | $HOSO_2$ | | $1.1 \cdot 10^{-12}$ |
| $HO_2$ | + | $SO_2$ | → | HO | + $SO_3$ | $<1 \cdot 10^{-18}$ |
| $O_3$ | + | NO | → | $NO_2$ | + $O_2$ | $1.8 \cdot 10^{-14}$ |
| OH | + | NO | → | HONO | | $6.7 \cdot 10^{-12}$ |
| $HO_2$ | + | NO | → | $NO_2$ | + OH | $6.6 \cdot 10^{-12}$ |
| O | + | NO | → | $NO_2$ | | $1.9 \cdot 10^{-12}$ |
| $O_3$ | + | $NO_2$ | → | $NO_3$ | + $O_2$ | $3.2 \cdot 10^{-17}$ |
| OH | + | $NO_2$ | → | $HNO_3$ | | $1.1 \cdot 10^{-11}$ |
| O | + | $NO_2$ | → | NO | + $O_2$ | $5 \cdot 10^{-12}$ |
| $O_3$ | + | $R-CH=CH_2$ | → | products | | $10^{-18}-10^{-17}$ |
| O | + | $R-CH=CH_2$ | → | products | | $10^{-13}-10^{-11}$ |
| OH | + | $R-CH=CH_2$ | → | products | | $10^{-12}-10^{-11}$ |

Experience has demonstrated that many of the harmful and noxious substances most frequently encountered in the modern industrial environment tend to display a relatively low rate of reaction with ozone. Analysis of the $K_{298}$ values set forth in Table 1 confirms that the reactions involving ions or radicals (O, OH, $HO_2$) are much more rapid than those of the same pollutants with ozone. To take advantage of these phenomena, it is another object of the present invention to provide an effective method and electrical apparatus for producing primarily highly active intermediate substituents (e.g., O, OH, $HO_2$ ions), rather than ozone.

SUMMARY OF THE INVENTION

The method and apparatus of the present invention overcome the disadvantages of the prior art apparatus of the first and second groups described above in several ways:

(1) The high voltage pulses are generated in the apparatus of the present invention by a Fitch pulse generator which is energized by the same power supply as is used for producing the constant direct-current voltage. The Fitch pulse generator, as will be described, includes an odd number (three or more) of series-connected power storage units. Each three sequential power storage unit forms a stage of the generator, with each third unit of each stage also forming the first unit of the subsequent stage. Accordingly, an n-stage Fitch pulse generator produces high voltage pulses superimposed on a constant charge voltage, with the amplitude of the high voltage pulses being 2n+1 times as high as the constant charge voltage.

The Fitch pulse generator is connected directly in parallel with the precipitation reaction chamber. The first power storage unit of the Fitch generator is connected directly to the output of the power supply without any isolating elements such as resistors or inductance coils. This arrangement avoids the power losses which occur in such elements in the prior art apparatus and protects the power supply from the high voltage pulses.

(2) A phase shifting network and a frequency divider are included in the apparatus of the invention enabling the generation of a switching pulse at the moment the rectified voltage of the power supply approaches zero, thus avoiding short circuits in the power supply during the time the switch is open, or in the case of electrical breakdown.

(3) Air spark dischargers, vacuum dischargers, or gas filled discharge tubes (thyratrons) are used as switches in the Fitch pulse generator. In the first two cases an isolating capacitor having a capacitance greater than that of the individual power storage units is connected in series with each switch in the Fitch generator in order to enable the closure of the switches to occur before the complete discharge of the corresponding power storage unit. Due to the presence of this capacitor the closure of each switch occurs after a short number of oscillations, and when the voltage across the isolating capacitor becomes equal and opposite in sign to the voltage of the power storage unit.

In the case of the thyratron, the device is connected directly in series with the power storage unit, the anode being connected with the initially positively charged output of the unit. As a rule, triggering elements in oscillatory circuits must have bidirectional conductivity. Air spark and vacuum dischargers are such elements. Commonly, thyratrons are used as elements having unidirectional conductivity. In the present invention, the physical characteristics of the gas discharge in a thyratron allow us to use the thyratron in oscillatory circuits as a bidirectionally conductive element for the first half-period of oscillation before the voltage applied across the tube changes its sign and switches the current off. The pulse duration required for generation of a pulsed streamer corona is in the range of 100–400 ns. During this very short period the gas discharge in the thyratron is not fully extinguished and the device remains bidirectionally conductive. This enables the sign of the power storage unit voltage to change completely during the first half of the oscillation.

A recuperation circuit comprising a diode connected in the direction opposite the positively charged output of the power storage unit and an inductance is inserted in each stage of the Fitch pulse generator thereby enabling the restitution of the initial state of the generator after closure of the thyratron.

The invention produces a pulsed streamer corona with electron energy greater than 10 eV. This is sufficient to ionize $O_2$ and $N_2$ as well as most admixture pollutant molecules. The concentration of ionized species in the vicinity of a high voltage electrode is approximately $10^{15}$ cm$^{-3}$ for ions and approximately $10^{17}$ cm$^{-3}$ for radicals. The main electron-to-molecule attachment process at high electric field strengths (volts/cm) is attachment+dissociation of $O_2$, $H_2O$ and $CO_2$, whose concentrations are therefore the dominant parameter for defining the value of the attachment coefficient. At lower electric field strengths, for example, where the average electron energy is lower than the dissociation threshold, the main attachment process is the oxygen three-body attachment.

The reaction rate for these reactions is relatively high. The initial fast electrons produced by the apparatus of the invention react quickly with $O_2$, $N_2$, etc. to produce the secondary ions and radicals referred to earlier. The reaction time of these groups of chemical reactions is generally lower than a few tens of microseconds. Following these, the slower chemical reactions involving the secondary radicals take place. Additionally, during this period the low concentration components ($NO_x$, $SO_2$, $NH_3$, organics, etc.) complete with active particles (oxygen atoms, etc.) reducing the production of oxygen. Nevertheless, the 2–3 seconds the waste stream remains in the reaction chamber of the apparatus of the invention are sufficient to enable the oxidants to destroy the admixture pollutant molecules.

The main ion and neutralization molecular reactions outlined in Table 1 are:

$N_2^+ + H_2O \rightarrow H_2O^+ + N_2$; $N^+ + H_2O \rightarrow H_2O^+ + N$; $O_2^+ + H_2O \rightarrow H_2O^+ + O_2$; $O^+ + H_2O \rightarrow H_2O^+ + O$; $CO_2^+ + H_2O \rightarrow H_2O^+ + CO_2$; $H_2O^+ + H_2O \rightarrow$ $H_3O^++OH$; $N_2^++O_2\rightarrow O_2^++N_2$; $O^++CO_2\rightarrow O_2^++CO$; $CO_2^++O_2\rightarrow O_2^++CO_2$; $e^-+O_2\rightarrow O_2^-$; $e^-+CO_2\rightarrow CO_2^-$; $O_2^-+CO_2\rightarrow CO_2^-+O_2$; $e^-+X^+\rightarrow X^*$; $CO_2^-+H_3O^+\rightarrow H+H_2O+CO_2$; and $O_2^++CO_2^-\rightarrow CO+O_2+O$.

The main ion-to-molecular reactions for $O_3$ production and decay are:

$O^-+O_2\rightarrow O_3+e$; $O_2^++O_3^-\rightarrow O_3+O_2$; and $O^-+O_3\rightarrow 2O_2+e$.

The main neutral particle reactions for $O_3$ production and decay are:

$O+O_2+O_2\rightarrow O_3+O_2$; $O(^3P)+O_3\rightarrow 2O_2$; $O(^1D)+O_3\rightarrow 2O_2$; $H+O_3\rightarrow OH+O_2$; and $OH+O_3\rightarrow HO_2+O_2$.

In the presence of admixture molecules (M) a competitive reaction (O, HO, $HO_2$, etc. )+M→products takes place.

In the subject invention, the waste stream passes through an electrostatic process that substantially increases the rate of production of highly reactive atoms, radicals and active reagents other than $O_3$. As a result, under similar conditions the invention is ten times more efficient than the chemical treatment with ozone alone in removing admixture pollutants from a waste stream.

As will become apparent from a reading of the following detailed description of a preferred embodiment of the invention, in addition to the removal of different kinds of harmful admixtures (e.g., $NO_x$, $SO_2$, $NH_3$, organics, etc.) from waste gaseous and liquid streams, the invention may be adapted for a variety of other purposes, such as the destruction of substances with bad odors (mercaptans, etc.), the disposal of noxious or poisonous substances, the sterilization of instruments, and the removal of bacteria, viruses, and similar contaminents from ventilating air streams and tap water.

BRIEF DESCRIPTION OF THE DRAWINGS

The preferred embodiment of the invention will now be described in conjunction with the accompanying drawings, in which.

DETAILED DESCRIPTION OF THE PREFERRED EMBODIMENTS

The electrical apparatus of the invention includes an electrostatic precipitator which serves to remove impurities from a stream of gases flowing through the reaction chamber 5 of the electrostatic precipitator from the inlet I to the outlet O of the chamber.

Figure 1:
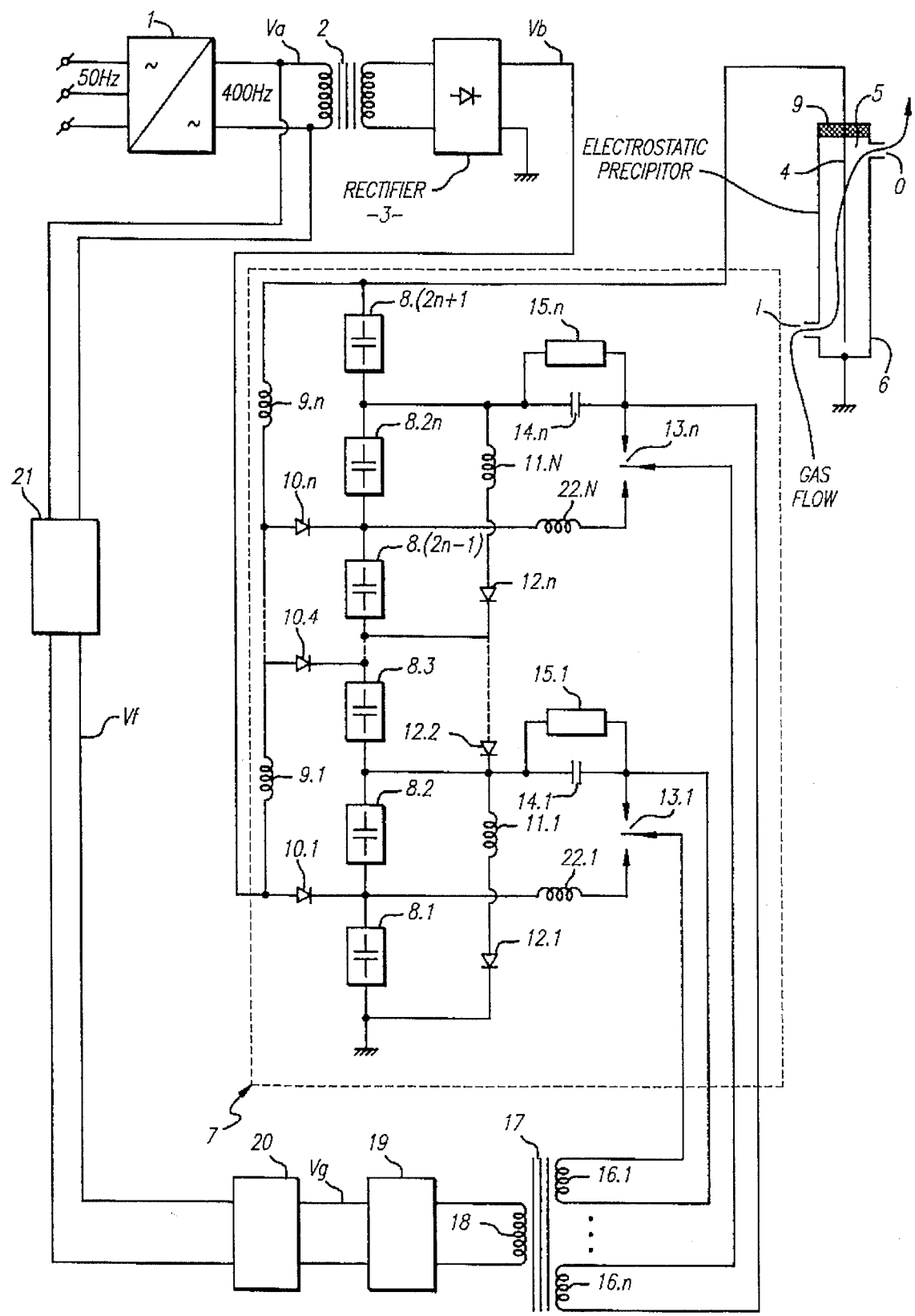
FIG. 1 is a general circuit diagram of a preferred embodiment of the invention comprising an electrical gas purifying apparatus constructed in accordance with the invention.

The circuitry of FIG. 1 includes a frequency convertor 1 for converting 3-phase 50–60 Hz AC line voltage into approximately 400 Hz single-phase AC voltage. Frequency convertor 1 may be any conventional frequency convertor of the type presently available on the market.

A single-phase high voltage transformer 2 is connected to the output of convertor 1, and this transformer raises the 400 Hz AC voltage from convertor 1 to a voltage having an amplitude of, for example, 30–100 Kv. The AC voltage from transformer 2 is rectified in a rectifier 3. The negative output terminal of rectifier 3 is grounded, and the positive terminal is connected to a Fitch pulse generator 7, which is connected to reaction chamber 5.

The reaction chamber 5 of the electrostatic precipitator includes a grounded cylindrical casing 6 formed, for example, of stainless steel. An elongated corona-producing collector electrode 4, likewise formed of stainless steel, extends coaxially with the cylindrical casing 6 into the reaction chamber. Electrode 4 is mounted in the grounded casing 6 by an insulating member 9 which causes the electrode to be insulated from the casing. The casing forms a second electrode for the electrostatic precipitator.

Fitch pulse generator 7 is an n-stage pulse generator. It is connected between collector electrode 4 of precipitator and ground. The Fitch generator includes 2n+1, an odd number of power storage units 8.1–8.(2n+1) connected in series. Typically, each of the power storage units may be a single, high voltage (50 Kv) industrial capacitor having a capacitance of approximately 0.15 mf, or it may comprise a group of such capacitors.

The odd number connecting points of the power storage units 8.1 . . . 8.(2n–1) are connected to electrode 4 through respective oscillation damping diodes 10.1–10.n and through series-connected inductance coils 9.1–9.n. The even number connecting points of the power storage units 8.2 . . . 8.2n are connected to ground through series-connected inductance coils 11.1 . . . 1.n, and oscillation damping diodes 12.1 . . . 12.n. The positive terminal of rectifier 3 is connected to the common junction of diode 10.1 and inductance coil 9.1. Frequency converter 1, transformer 2, and rectifier 3 form the power supply for the apparatus.

Triggering circuits, including switches 13.1–13.n having respective first main electrodes connected in series with respective capacitors 14.1–14.n and resistors 15.1–15.n, have their first and second main electrodes connected in parallel with the even power storage units 8.2 . . . 8.2n, through the capacitors, resistors, and discharge inductances 22.1–22.n. The latter can be simply the inductances of the electrical connections in the circuit. Each of the switches 13.1–13.n has a trigger electrode connected to one terminal of corresponding secondary windings 16.1–16.n of a pulse transformer 17. The first main electrodes of switches 13.1–13.n are each connected to the other terminal of the corresponding secondary windings 16.1–16.n of transformer 17.

The primary winding 18 of pulse transformer 17 is connected to the output of an ignition pulse generator 19 whose controlling input circuit is connected to the output of a frequency divider 20. The controlling input circuit of frequency divider 20 is connected to the output of a phase shifting network 21 which, in turn, is connected to frequency convertor 1.

Figure 1A:
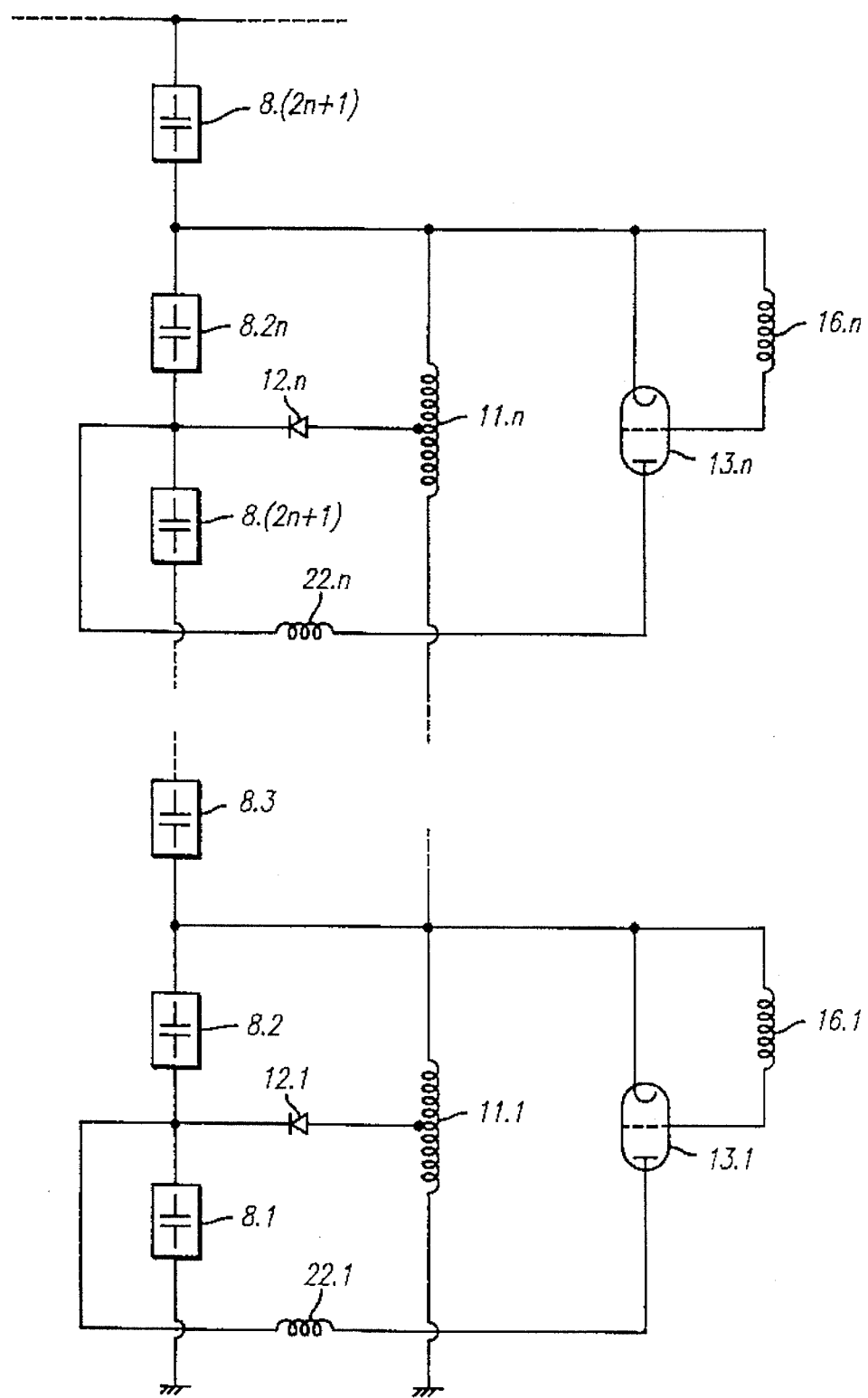
FIG. 1a is a circuit diagram of a portion of the circuit of FIG. 1 utilizing a thyratron as a controlled switch.

Referring to FIG. 1a, the anodes of thyratrons 13.1–13.n are connected in series with discharge inductances 22.1–22.n which are connected in turn with odd-numbered power storage units 8.1–8.(2n–1). The cathodes are connected to respective even-numbered power storage units 8.2–8.2n. Secondary windings 16.1–16.n of the pulse transformer 17 are connected between the cathodes and control grids of thyratrons 13.1–13.n. Earthing inductances 11.1–11.n are connected across adjacent pairs of power storage units 8.1+8.2, . . . , 8.(2n-1)+8.2n. The anodes of damping diodes 12.1–12.n are connected with intermediate points of inductances 11.1–11.n, dividing them approximately in the ratio 1:2, whereas the cathodes of diodes 12.1–12.n are connected with odd-numbered power storage units 8.1–8.n.

Figure 2:
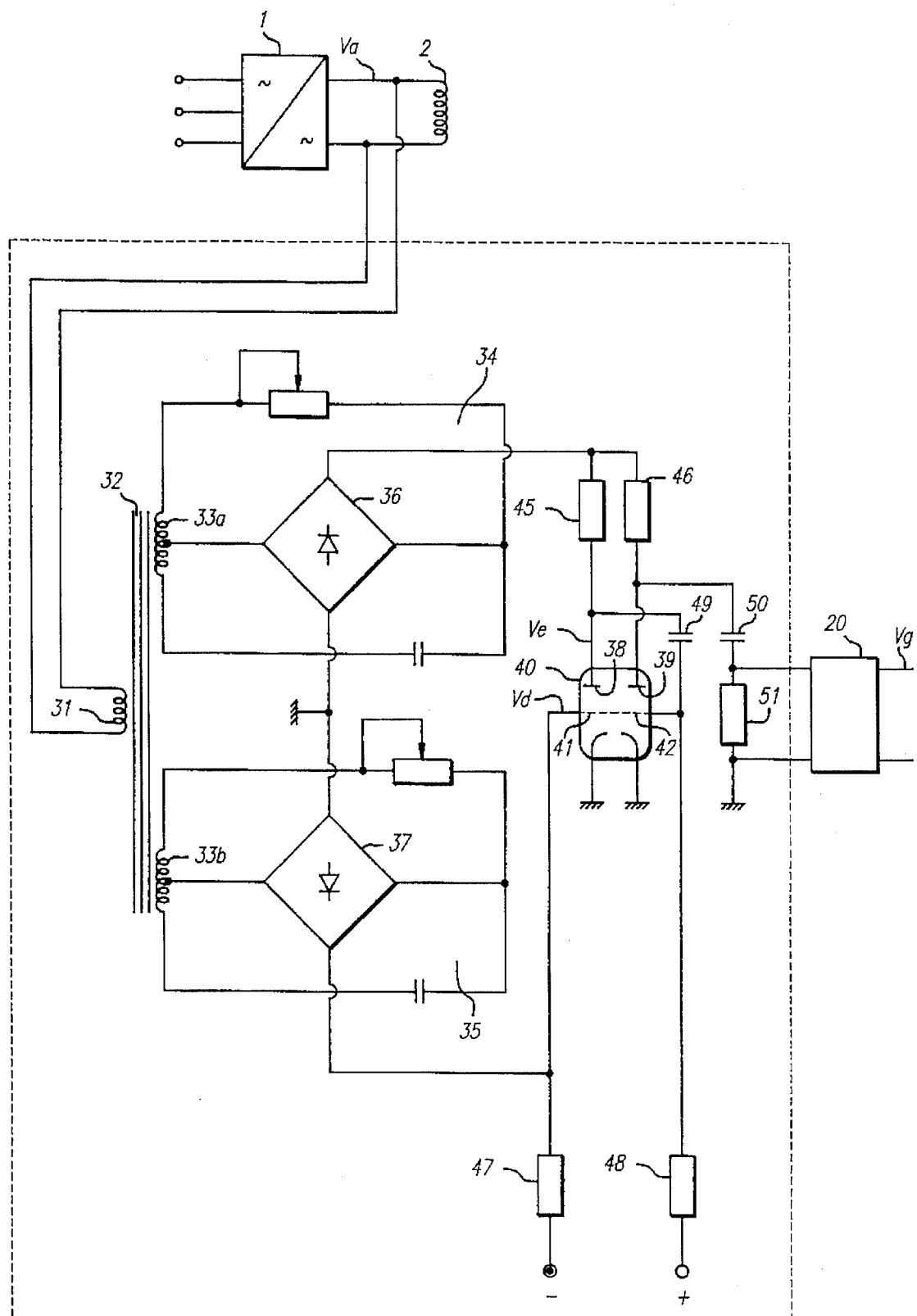
FIG. 2 is a schematic circuit diagram of a pulse shifting network which is incorporated into the apparatus of FIG. 1.

The phase shifting network 21 is shown in circuit detail in FIG. 2. This network produces an output pulse each time the AC voltage from convertor 1 (appearing across the primary winding of transformer 2) approaches zero.

The phase shifting network 21 of FIG. 2 includes a transformer 32 whose primary winding is connected across the output of frequency convertor 1. Transformer 31 includes two independent secondary windings 33a and 33b which are connected to respective rectifier bridges 36 and 37 which are included in independent phase shifting networks 34, 35. The rectifying bridges each provide a two-cycle rectified voltage of positive polarity with double the frequency of the output voltage from frequency convertor 1, that is, 800 Hz. The negative terminals of rectifier bridges 36 and 37 are grounded. The positive terminal of bridge 36 is connected through resistors 45 and 46 to the anodes 38 and 39 of a double triode 40, and the positive terminal of bridge 37 is connected to the left side control grid 41 of triode 40.

Control grid 41 is connected through a resistor 47 to the negative terminal of a DC biasing source so that the left side of triode 40 is normally non-conductive. The right side control grid 42 of triode 40 is connected through a resistor 48 to the positive terminal of the DC biasing source so that the right side of triode 40 is normally conductive. The cathodes of triode 40 are grounded. Anode 38 is coupled through capacitor 49 to control grid 32, and anode 39 is coupled through capacitor 50 to a grounded resistor 51, the resistor being connected across the input terminals of frequency divider 20.

The operation of the circuits of FIGS. 1, 1a, and 2 will now be described with reference to the timing curves of FIGS. 3(a)–3(g). For simplified descriptive purposes, the curves of FIGS. 3(a)–(g) relate to a particular apparatus embodying the invention in which n equals 1, that is, to a Fitch pulse generator with three power stage units 8.1, 8.2 and 8.3. The 400 Hz output voltage Ua from frequency convertor 1 is represented by curve A in FIG. 3(a). During the first half cycle of the output voltage Ub from rectifier 3 (curve B in FIG. 3(b)) power storage units 8.1, 8.2, 8.3 are charged to an amplitude $U_2$. If at the end of the half cycle there is no ignition pulse, then during the next half cycle the voltage Ub remains approximately equal to $U_2$, as shown in curve B.

Figure 3A:
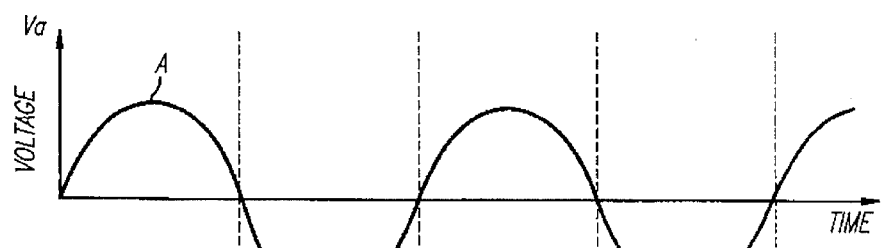
FIGS. 3(a)–3(g) are a series of timing curves useful in explaining the operation of the apparatus of FIGS. 1 and 2.
Figure 3B:
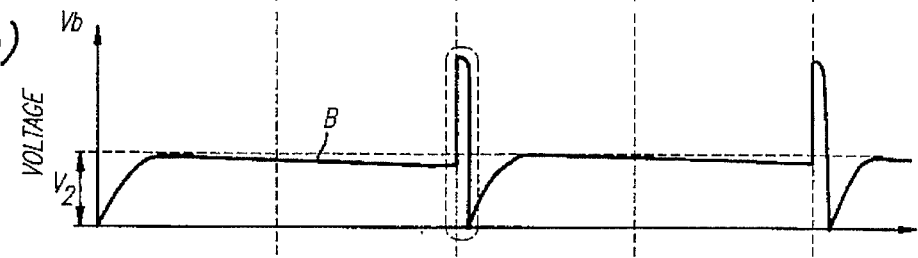
Figure 3C:
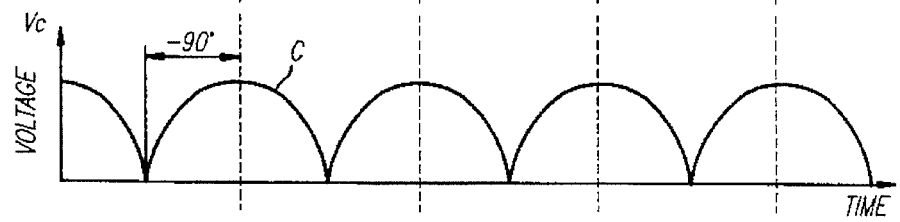
Figure 3D:
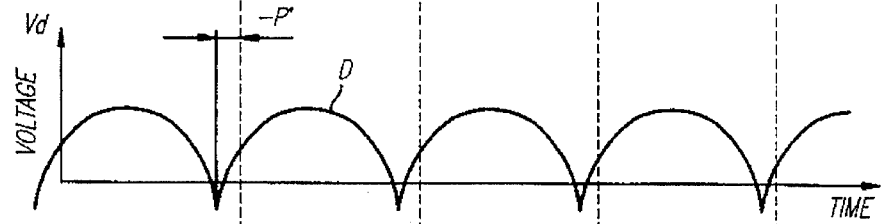

At the same time a positive half-cycle voltage from phase shift network 34 (FIG. 2) in phase shifting network 21, shifted backwards by 90 degrees (curve C of FIG. 3(c)), is applied to the anodes 38, 39 of triode 40. Accordingly, a peak voltage is applied to the anodes 38, 39 at the moment output voltage Ua from frequency convertor 1 is zero (curve A). Another positive half-cycle voltage Ud from phase shift network 35 (FIG. 2) is applied to grid 41 of triode 40. This voltage, as shown by curve D of FIG. 3(d), is shifted backwards by p degrees depending on the volt-ampere characteristics of triode 40 and on the amplitude of the negative bias voltage applied to control grid 41. The value of p degrees must be adjusted so that the non-conductive left side of triode 40 is rendered conductive at the moment of zero voltage of the voltage Ua (curve A).

Figure 3E:
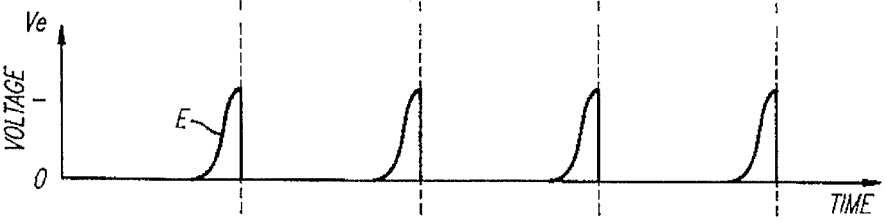

When the left side of triode 40 is rendered conductive, a negative pulse Ue (curve E of FIG. 3(e)) occurs at the anode 38 and is applied to the right side grid 42 to render the right side of the triode 40 conductive. This produces a positive pulse Uf (curve F of FIG. 3(f)) at anode 39 and at the output of phase shifting network 21 which is applied to the input of frequency divider 20. The voltage at anode 39 remains near zero until the voltage Ud applied to grid 41 becomes sufficiently low to return the left side of triode 40 to its non-conductive state. Then the cycle recommences. Accordingly, for the major part of the cycle the left side of triode 40 is non-conductive and immune from electrical disturbances.

Figure 3F:
Figure 3G:
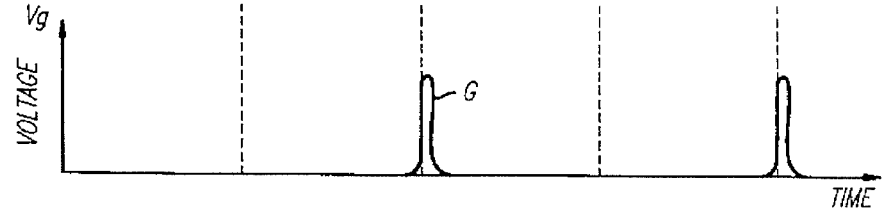

Frequency divider 20 increases the time between two sequential pulses in wave form F of FIG. 3(f). The wave form G of FIG. 3(g), which represents the output of frequency divider 20, contains pulses Ug which correspond to each of the pulses Uf of wave form F, or to every second pulse (k=2) (as shown), or every third pulse, etc. This allows an easy control of the operating power of the system of FIG. 1.

When a pulse Ud from the pulse train wave form F from frequency divider 20 enters the input of the ignition pulse generator 19, the pulse generator introduces a voltage pulse across the primary winding 18 of pulse transformer 17. This results in a high voltage pulse appearing across the secondary winding 16.1 which is introduced between the second of the main electrodes and the ignition electrode of switch 13.1, and in the case of a thyratron between the cathode and the control grid of the thyratron. This results in a breakdown of the switch and causes an oscillating circuit to be formed which includes power storage unit 8.2 and discharge inductance 22.1. An oscillatory action is set up in the oscillation circuit which recharges the capacitors in power storage unit 8.2 with a cycle of 100–400 ns depending upon the capacitances and inductances involved in the oscillation circuit.

As the time constant of the circuits formed by power storage units 8.1 and 8.3 and inductance coils 9.1 and 11.1 is several times larger than the cycle of the Fitch pulse generator oscillation during the first period of this oscillation, the voltage on the power storage units 8.1 and 8.3 remains approximately constant, and the voltage on the power storage unit 8.2 after one-half of the main oscillation period changes its sign and the full output voltage of the first stage of the Fitch power generator becomes a sum of approximately three charged voltages.

It can be seen that in general a Fitch pulse generator having n stages, i.e., 2n+1 power storage units charged to a voltage U superimposes over the constant DC charged voltage a pulsating voltage (curve 2B) which has an amplitude approximately equal to 2nU. This pulsating voltage and the constant DC voltage (curve $U_2$) are applied to the corona-producing electrode 4 and give rise to a streamer corona discharge in chamber 5 with current pulse amplitude and duration depending on the geometry of the chamber and on the steepness and amplitude of the voltage pulse.

Figure 4:
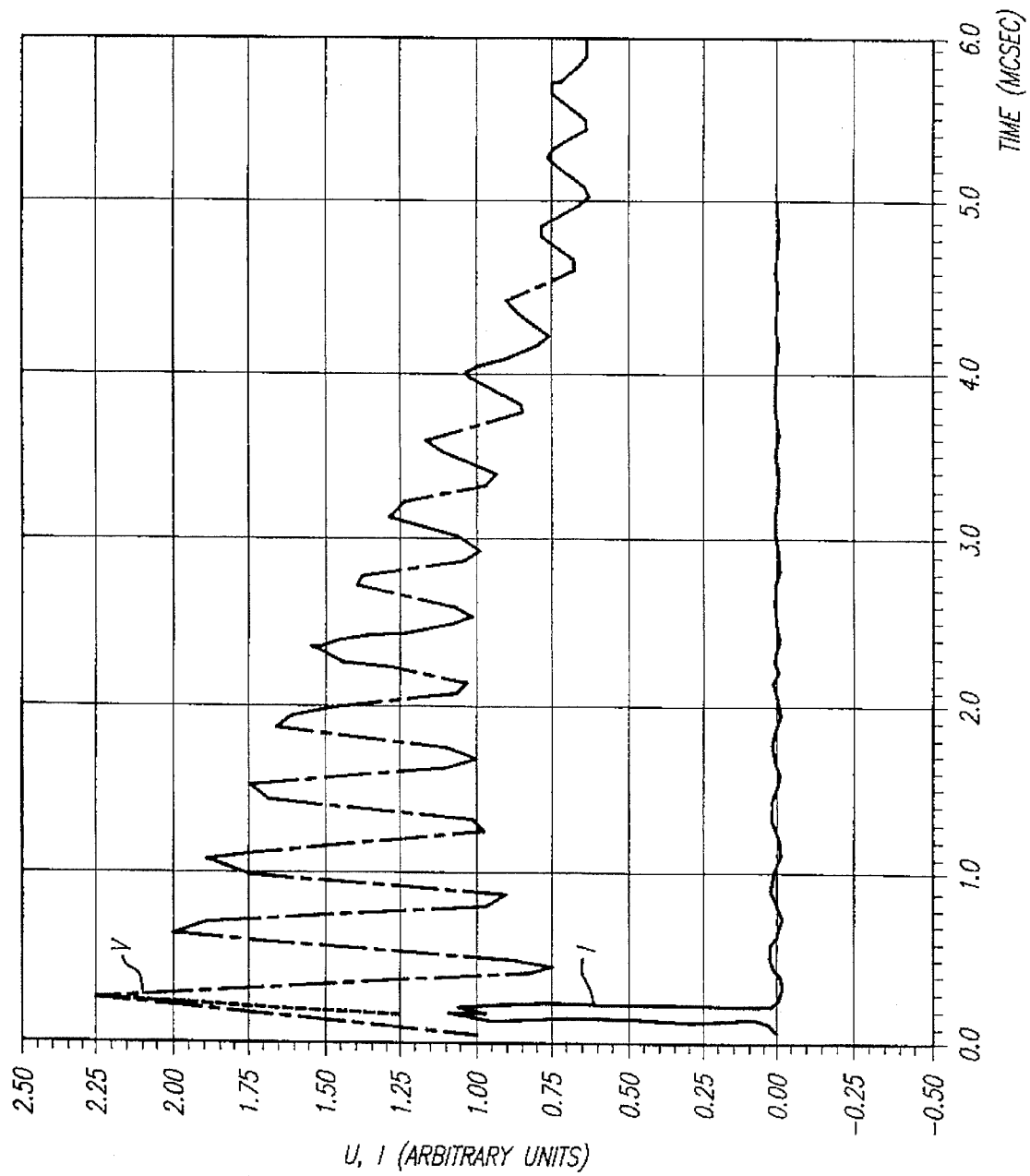
FIG. 4 illustrates an example of an oscillogram representing certain reactions in the reaction chamber of an electrostatic precipitator included in the apparatus to be described.

FIG. 4 represents an example of an oscillogram of a single-stage Fitch pulse generator voltage pulse (U) and a corona streamer current pulse (I) produced in the electrostatic precipitator chamber 5. The corona streamer discharge produces a high density high energy electron flow in the gas stream flowing through the chamber which initiates chemical reactions. These chemical reactions result in the conversion of the noxious substances in the gas into aerosols or solid particles which are removed from the gas by the constant DC voltage fed to the electrode 4.

The Fitch power generator pulse duration is much shorter than the period of the AC input voltage. During the time the Fitch pulse generator oscillates, the AC input voltage remains near zero and does not produce any external current to feed the discharge in the switches. After several Fitch power generator oscillations, the voltages of power storage units 8.2 . . . 8.2n become approximately equal and opposite in sign to the voltage of the corresponding isolating capacitors 14.1 . . . 14.n. This results in approximately zero voltages on switches 13.1 . . . 13.n, and the elimination of switch discharges. Numerical calculations show that at this moment the residual voltages on the capacitors do not exceed one-third of the initial charge voltage.

In the case of a thyratron, the oscillations stop after the first half-period due to the automatic closure of the thyratron. The voltage of the even-numbered power storage units 8.2–8.2n remains opposite in sign to the charge voltage.

Simultaneously with the main oscillatory process, additional oscillations occur in the Fitch power generator with frequencies depending upon the capacitances of capacitors 8.1–8.(2n+1) and the inductances of inductance coils 9.1–9.n and 11.1–11.n, these frequencies being much lower than the main Fitch power generator frequency. The diodes 10.1–10.n and 12.1–12.n serve to damp the additional oscillations after their first half cycle. In the case of a thyratron, a recuperation circuit comprising diodes 12.1–12.n and inductances 11.1–11.n causes the residual power of the even-numbered storage units 8.2–8.2n to be redistributed among the other storage units 8.1–8.(2n-1) without oscillations and hence without substantial attenuation. Thus during the time necessary for the extinction of switch discharges the power storage unit voltages do not fall very low as compared with the charge voltage, thus providing during this time the DC voltage necessary for the removal of the reaction products from the flow of gases in the chamber 5 of the electrostatic precipitator.

After all oscillations have terminated, the output voltage of the Fitch power generator returns, due to the leakage of residual charges across the power storage units, to a level dependent upon the power fed into the reaction chamber 5 by the corona streamer current from the collector electrode 6, and the power stored in the capacitors 14.1–14.n. This level of restored voltage can attain 60% of initial charge voltage. The values of resistors 15.1–15.n are selected to insure the full discharge of separating capacitors 14.1–14.n in the interval between successive Fitch power generator pulses. The power dissipated in resistors 15.1–15.n does not exceed 30% of the power supplied to the Fitch power generator from the electrical mains.

From the foregoing description it will be seen that operating in conjunction with a single power supply, the Fitch pulse generator 17 supplies high voltage pulses to the electrostatic precipitator which are superimposed on a constant DC voltage. The high voltage pulses have the required frequency and amplitude to establish a corona discharge in chamber 5 of the electrostatic precipitator which has sufficient intensity to ionize the noxious substances in the gases flowing through the chamber, and the constant DC voltage has sufficient amplitude to remove the resulting substances from the gases.

The principal advantages of the methods and means comprising the present invention may be summarized as follows:

(1) Relatively high efficiency of the gas cleaning process in the electrostatic precipitator of reaction chamber 5;

(2) Relatively low electric power consumption due to quick closure of the switches 13.1 . . . 13.n in the Fitch generator, and conservation of a considerable part of power which is stored in the generator, and the absence of extraneous elements dissipating any part of the power taken from the power supply 3;

(3) Good control of consumed power due to easy achievement of a required frequency and amplitude of the pulse voltage which is superimposed over the constant voltage;

(4) Good protection of the power supply from short circuits and harmful action of the output high voltage pulses; and (5) Simplicity of construction and large-scale use of industrially fabricated conventional devices and elements.

It will be appreciated that while a particular embodiment of the invention has been shown and described, modifications may be made. It is intended in the following claims to cover all such modifications which fall within the true spirit and scope of the invention.

We claim:

1. Electrical apparatus for removing noxious substances from a stream of fluid comprising:

an electrical precipitator including a reaction chamber through which a stream of fluid passes, and a corona-producing electrode extending into said reaction chamber;

a power supply including a rectifier for producing a rectified voltage output in response to an alternating current line voltage input;

a multi-stage Fitch generator connected to said power supply and including an odd number of capacitive power storage units to be charged to a predetermined constant direct current voltage by the rectified voltage output of said power supply;

said Fitch generator further including a trigger circuit connected to said power storage units for causing said power storage units to produce a pulsating voltage superimposed on said constant charged direct current voltage; and circuit means connected to said power storage units for introducing said pulsating voltage superimposed on said constant direct current charged voltage to said corona-producing electrode.

2. The electrical apparatus defined in claim 1, wherein said power supply includes a frequency converter for converting the frequency of said alternating current line voltage to a relatively high frequency, and a transformer for transforming the voltage from said frequency converter to a relatively high voltage for application to said rectifier, whereby the rectified output voltage from said rectifier may have a relatively high amplitude.

3. The electrical apparatus defined in claim 2, wherein:

said line voltage is three-phase having a frequency of the order of 50–60 Hz;

said frequency converter converts the line voltage to single-phase having a frequency of the order of 400 Hz; and said power supply includes a transformer for raising the level of the voltage from the frequency converter to the order of 30–100 Kv.

4. The electrical apparatus defined in claim 2, further comprising circuitry connecting the output of said frequency converter to the trigger circuit included in said multi-stage Fitch generator.

5. The electrical apparatus defined in claim 4, wherein:

said trigger circuit includes switching means for causing said power storage units to produce said pulsating voltage, and circuit means for causing rapid extinction of the switch discharge; and said connecting circuitry includes a phase shifting network for causing said switching means to be actuated only when the output of said frequency converter is at a minimum amplitude level.

6. The electrical apparatus defined in claim 5, wherein said switching means are thyratrons.

7. The electrical apparatus defined in claim 5, wherein:

the output of said phase shifting network is a pulse signal; and a frequency divider is connected to said phase shifting network for reducing the repetition frequency of said pulse output signal to a predetermined repetition frequency.

* * * * *